United States Patent
Elazary et al.

(10) Patent No.: US 11,037,097 B2
(45) Date of Patent: Jun. 15, 2021

(54) LOCAL CACHES FOR LAST-MILE ITEM DISTRIBUTION

(71) Applicant: inVia Robotics, Inc., Agoura Hills, CA (US)

(72) Inventors: Lior Elazary, Agoura Hills, CA (US); Randolph Charles Voorhies, Culver City, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 563 days.

(21) Appl. No.: 15/201,241

(22) Filed: Jul. 1, 2016

(65) Prior Publication Data

US 2018/0005185 A1  Jan. 4, 2018

(51) Int. Cl.
*G06Q 10/08* (2012.01)

(52) U.S. Cl.
CPC ..... *G06Q 10/0836* (2013.01); *G06Q 10/0832* (2013.01); *G06Q 10/0833* (2013.01); *G06Q 10/08355* (2013.01)

(58) Field of Classification Search
CPC ........... G06Q 10/0832; G06Q 10/0833; G06Q 10/08355; G06Q 10/0835; G06Q 10/0836; B65G 1/1373
USPC ......................................................... 705/330
See application file for complete search history.

(56) References Cited

U.S. PATENT DOCUMENTS

| | | | |
|---|---|---|---|
| 2011/0238457 A1* | 9/2011 | Mason ............... | G01C 21/3469 705/7.14 |
| 2014/0052498 A1* | 2/2014 | Marshall ............... | G07F 11/165 705/7.35 |
| 2014/0074743 A1* | 3/2014 | Rademaker ............ | G06Q 50/28 705/334 |
| 2014/0249938 A1* | 9/2014 | Garrett ................... | G06Q 50/12 705/15 |
| 2014/0279269 A1* | 9/2014 | Brantley ............ | G06Q 30/0635 705/26.81 |
| 2014/0279270 A1* | 9/2014 | Bertanzetti ........ | G06Q 30/0635 705/26.81 |

(Continued)

OTHER PUBLICATIONS

Kim et. al., Clustering-based order-picking sequence algorithm for an automated warehouse, int. j. prod. res., 2003, vol. 41, No. 15, 3445-3460 (Year: 2003).*

*Primary Examiner* — Emmett K. Walsh
(74) *Attorney, Agent, or Firm* — Ansari Katiraei LLP; Arman Katiraei; Sadiq Ansari (57) ABSTRACT

Local caches are provided for last-mile item distribution. Each local cache stores items belonging to different customers. A management server tracks customer locations relative to a local cache. The management server instructs at least one robot within the local cache to ready for pickup items belonging to a particular customer as the particular customer nears the local cache. The robot retrieves and queues the items for pickup prior to the particular customer arriving at the local cache. The item is transferred once the particular customer arrives at the local cache. The management server monitors the position through a front-end application running on a mobile device of the particular customer. The application can also be used to contact delivery drivers to deliver items on behalf of customers that do not wish to pickup items from the local cache.

21 Claims, 9 Drawing Sheets

(56) References Cited

U.S. PATENT DOCUMENTS

| | | | |
|---|---|---|---|
| 2015/0032252 A1* | 1/2015 | Galluzzo | B25J 15/0608 700/218 |
| 2015/0161563 A1* | 6/2015 | Mehrabi | G06Q 10/08355 705/338 |
| 2015/0291357 A1* | 10/2015 | Razumov | B65G 1/1373 414/279 |
| 2016/0063436 A1* | 3/2016 | Coles | G06Q 10/08345 705/335 |
| 2016/0071190 A1* | 3/2016 | Voelz | G06Q 30/0635 705/26.81 |
| 2016/0244311 A1* | 8/2016 | Burks | B67D 1/0888 |
| 2017/0116570 A1* | 4/2017 | Schroeder | G06Q 50/01 |
| 2017/0200218 A1* | 7/2017 | Napper | G06Q 10/08 |

\* cited by examiner

LOCAL CACHES FOR LAST-MILE ITEM DISTRIBUTION

BACKGROUND INFORMATION

Online and ecommerce sales continue to increase year over year. Merchants have realized the benefits of moving online so that their sales are no longer restricted to localities in which the merchant has established storefronts. Merchants that are strictly online have also realized that they do not need physical storefronts to sell to customers.

In either case, shipping costs are one of the largest expenses associated with selling goods online, especially as customers expect free shipping or shipping costs to be absorbed in the price of goods. To offset shipping costs, some merchants require a minimum transaction amount before offering free shipping. Other merchants have negotiated extensive deals for reduced shipping rates with the postal service and various shipping providers. Still other merchants have hired contractors or created their own shipping network. All these efforts are directed to reducing shipping costs and the expense with transacting business online.

Much of the shipping cost stems from the last-mile delivery of items to customer's door front. Shipping typically begins with a merchant shipping a set of items from its warehouse to a regional or local distribution center of a shipping provider. In this first shipment leg, the shipping cost per individual item is relatively low, because the set of items ships together to one common destination (i.e., the distribution center). The second shipment leg is the last-mile delivery of the items from the shipping provider distribution center to the customer door fronts. The shipping provider users a fleet of trucks that drive from the distribution center to different customer door fronts for individual delivery of each item in the set of items. This second shipment leg is where a significant portion of the shipping costs are incurred. Accordingly, there is a need to reduce shipping costs, especially with respect to the last-mile delivery of items.

BRIEF DESCRIPTION OF THE DRAWINGS

A preferred embodiment for last-mile item distribution local caches will now be described, by way of example only, with reference to the accompanying drawings in which.

DETAILED DESCRIPTION OF PREFERRED EMBODIMENTS

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which robotic automation of last-mile item distribution can be practiced. It is to be understood that other embodiments can be used and structural changes can be made without departing from the scope of the embodiments herein described.

Disclosed are systems and methods for performing alternative last-mile item distribution. The systems and methods differ from today's shipping paradigm in that they do not involve a shipping provider delivering a customer order item from a merchant to the customer's door front.

Some embodiments establish local caches for last-mile item distribution. The local caches are physical locations that serve as last-mile distribution centers. The local caches are geographical proximate to different sets of customers. Ideally, the local caches are located in high traffic areas along commonly traveled routes. The local caches can be placed within existing locations such as supermarkets or post office branches. Alternatively, the local caches can be dedicated locations from which customers pickup ordered items.

Merchants ship items for customers in different geographic regions to the local caches that were established for each respective geographic region. Merchants can also ship items for different customers to a local cache of the customers' choosing. Overall shipping costs are reduced as a result of the merchants shipping many items of different customers in a particular geographic region to the local cache for that particular geographic region as opposed to each different customer address.

Figure 1:
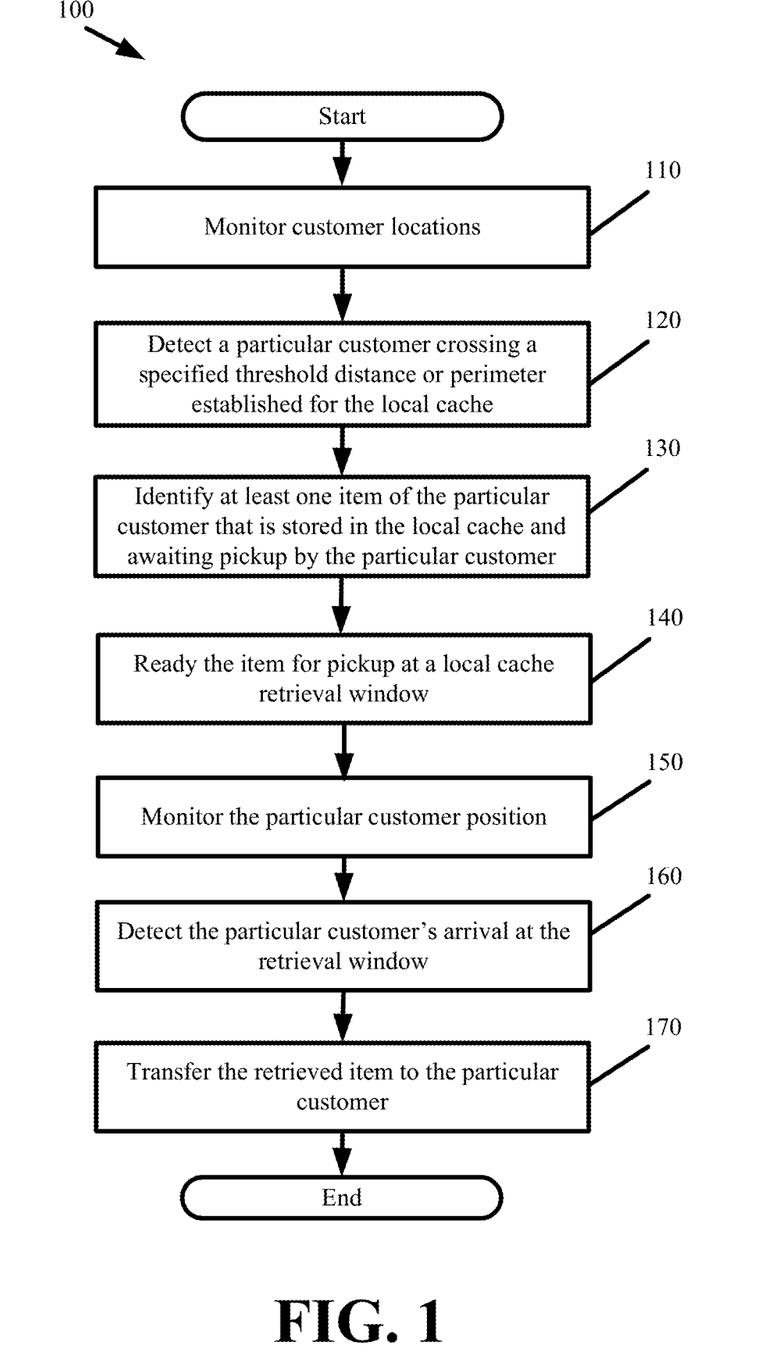
FIG. 1 presents a process for eliminating last-mile shipping costs with automated last-mile item distribution at a local cache of some embodiments.

FIG. 1 presents a process 100 for eliminating last-mile shipping costs with automated last-mile item distribution at a local cache of some embodiments. The process 100 involves monitoring (at 110) customer locations, preferably through a front-end application that the customers install on their mobile devices. From the customer monitoring, the process detects (at 120) a particular customer crossing a specified threshold distance or perimeter established for the local cache. The process identifies (at 130) at least one item of the particular customer that is stored in the local cache and awaiting pickup by the particular customer. The process then instructs a robot, other automation, or human handler within the local cache to ready (at 140) the item for pickup at a local cache retrieval window or port while the particular customer remains en route to the local cache. The instruction identifies the customer item. The identification can specify where the item is stored in the local cache. More specifically, the identification can specify coordinates for the item location, a path or map to the item, an identifier (e.g., barcode, Quick Response code, etc.) identifying the item location, and/or images or description of the item. The instruction can also specify a particular retrieval window from several local cache retrieval windows where the item is to be queued for pickup. The process continues monitoring (at 150) the particular customer position while the item is queued at the particular retrieval window. The monitoring verifies that the particular customer continues to the local cache and does not deviate from the route. The monitoring further allows the process to detect (at 160) the particular customer's arrival at the retrieval window at which point the retrieved item is transferred (at 170) to the particular customer. In this manner, the particular customer receives his items from the retrieval window and drives on without having to exit his vehicle or identify himself and wait for items to be retrieved post verification.

For customers that are unable or do not want to pickup items from the local caches, some embodiments leverage for-hire delivery drivers to perform the last-mile delivery on the customer behalf. To reduce the costs associated with the last-mile delivery using for-hire delivery drivers, some embodiments determine optimal routes for delivering a set of items to the door fronts of neighboring customers and assign delivery drivers to perform the item delivery according to the optimal routes. Some embodiments allow customers to set pricing for the last-mile delivery of their items.

Figure 2:
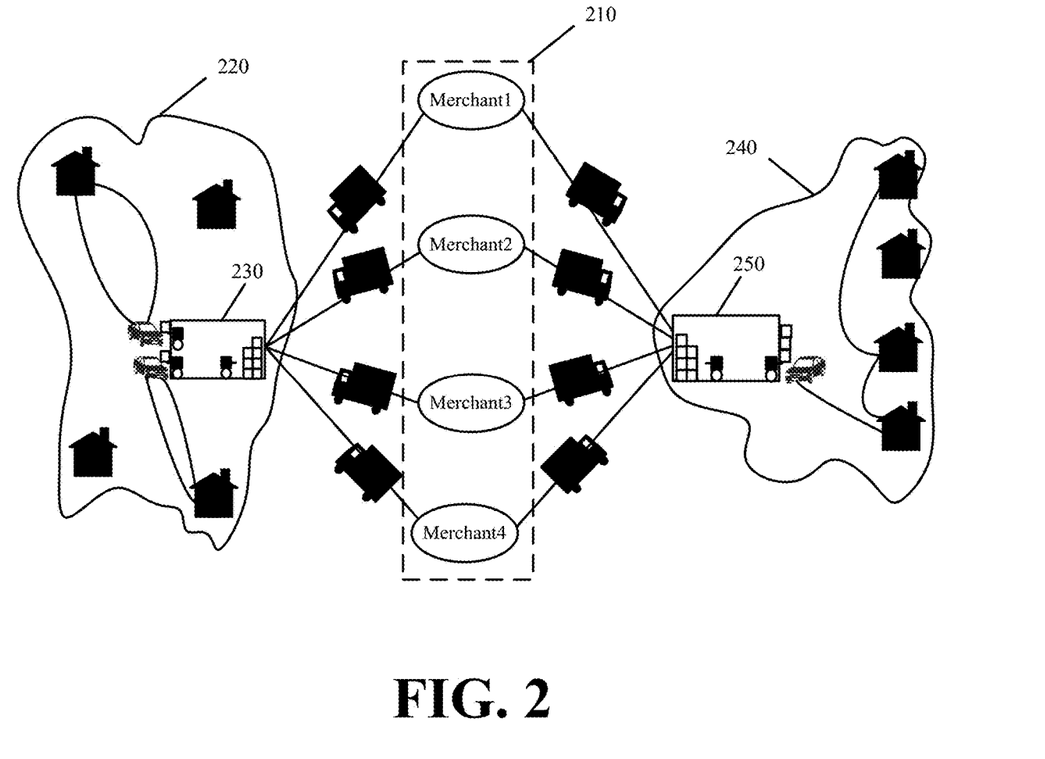
FIG. 2 conceptually illustrates local caches providing last-mile item distribution for two different geographic regions in accordance with some embodiments

FIG. 2 conceptually illustrates local caches providing last-mile item distribution for two different geographic regions in accordance with some embodiments. FIG. 2 illustrates merchants 210 shipping items ordered by any customer of a first set of customers in a first region 220 to a first local cache 230 and items ordered by any customer of a second set of customers in a second region 240 to a different second local cache 250.

The first local cache 230 is located within the first region 220 and provides last-mile item distribution for the first region 220 for the first set of customers therein. In this first region 220, the customers pickup their items from the first local cache when it is convenient for them.

The second local cache 250 is located within the second region 240 and provides last-mile item distribution for the second region 240 for the second set of customers therein. In this second region 240, a delivery driver picks up items for three different customers of the second geographic region 240 and delivers the items on the customer behalf.

Each local cache has one or more delivery ports, one or more retrieval windows or ports, a set of robots, and a management server. Bulk shipments of customer order items are delivered to the local cache through the delivery port. When a shipping provider delivers items to the local cache, the items are scanned and entered into the local cache inventory. The management server maintains a database to track the local cache inventory of all customer order items pending last-mile distribution. As new items arrive at the local cache, the management server determines the customers or delivery drivers responsible for the last-mile distribution of the items and notifications are sent to those customers or delivery drivers. The notifications can be in the form of emails or wireless alerts.

The retrieval windows or ports are drive thru accessible locations at which customers or for-hire delivery drivers pickup customer order items from the local cache. A local cache may have one or more such windows or ports.

The management server coordinates the actions of the robots based on customer or delivery driver movements and positioning. The management server tracks customer or delivery driver movements. The management server then instructs the robots to ready items of a particular customer as the particular customer nears or travels towards the local cache.

The management server instruction to a local cache robot causes the robot to navigate within the local cache to identify a storage location of at least one item within the local cache, wherein the at least one item belongs to a particular customer that the management server detects to be heading towards the local cache. The robot retrieves the at least one item before queuing the item at a specific local cache retrieval window or port in order to transfer possession to the particular customer upon the particular customer's arrival at the window or port. In other words, by the time the particular customer drives up to the retrieval window or port, the robot will have delivered the items to that window or port and the particular customer can take possession of the items without waiting or having to exit the vehicle.

In some embodiments, the local cache supplements or replaces the robots with human handlers. In some such embodiments, the management server instructs the human handlers through mobile devices carried by the human handlers.

The management server is one or more computing machines with processors and network connectivity. A single central management server can manage robot operation and order retrieval at multiple local caches. A management server can be located in each local cache in order to manage robot operation and order retrieval for customers for a particular local cache. In some embodiments, a central management server communicates with management servers that are located within each local cache, thereby providing a distributed hierarchical system for managing robot operation and item retrieval.

Any robot that can be communicably coupled to and instructed by the management server having means to navigate, retrieve, and move items within the local cache can be used in implementing the embodiments set forth herein. An exemplary robot for automating item retrieval in a local cache of some embodiments is described in U.S. Pat. No. 9,120,622. The contents of U.S. Pat. No. 9,120,622 are incorporated herein by reference. Other aerial or wheel-based robots can also be used.

Figure 3:
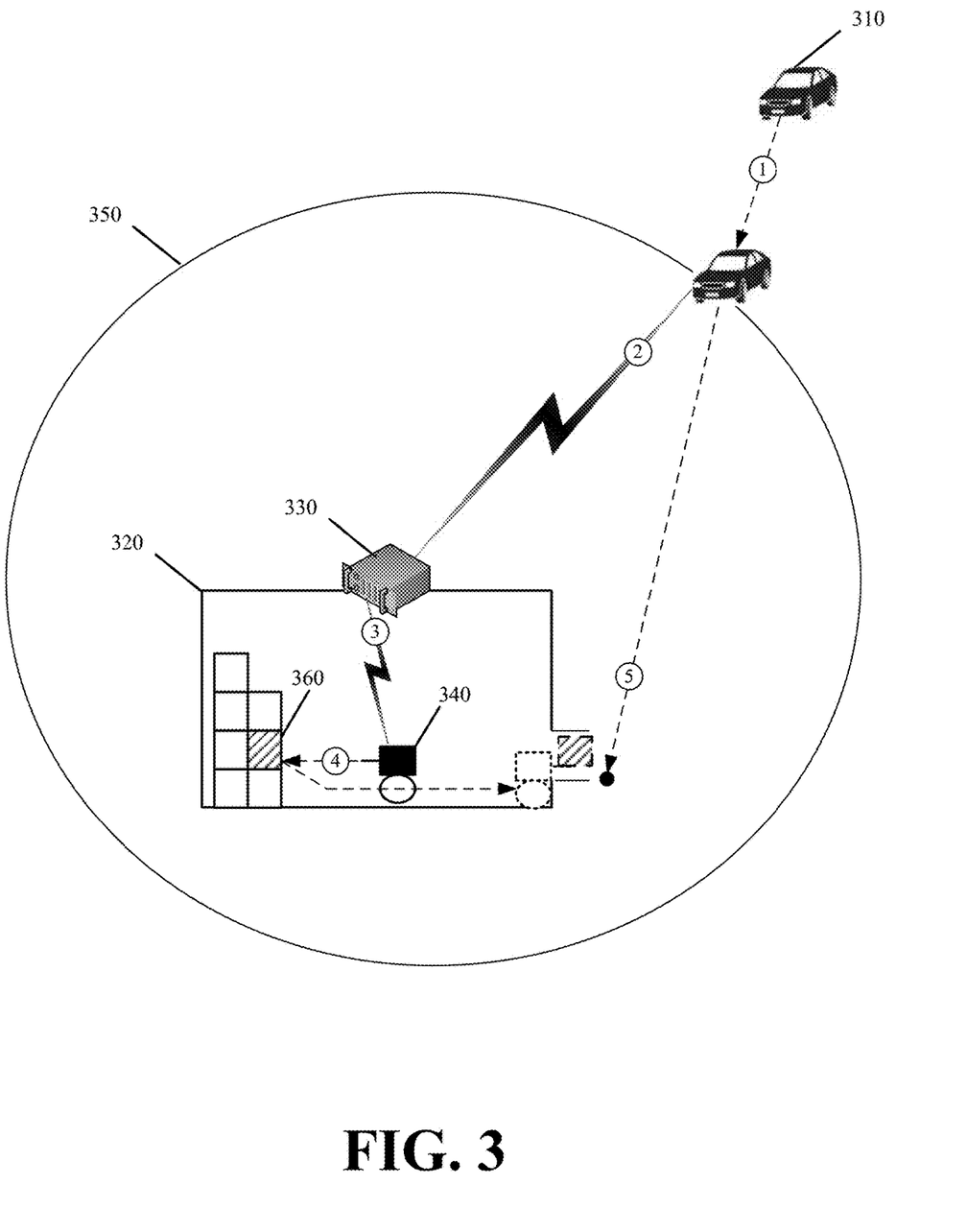
FIG. 3 illustrates management server and robot operation for automating last-mile item distribution within a local cache in accordance with some embodiments.

FIG. 3 illustrates management server and robot operation for automating last-mile item distribution within a local cache in accordance with some embodiments. The figure illustrates a particular customer 310, a local cache 320 storing different customer items pending last-mile distribution, a management server 330, and a robot 340 operating within the local cache.

The management server 330 detects the particular customer 310 crossing a threshold distance or perimeter 350 established for the local cache 320. The management server 330 performs a query to determine that the particular customer 310 has at least one item 360 awaiting pickup at the local cache 320. The management server 330 then instructs the robot 340 to set about retrieving and readying the at least one item 360 for pickup. By the time, the particular customer 310 arrives at the local cache retrieval window, the robot 340 has retrieved and queued the item at the window for the particular customer to take possession.

A front-end application tracks or conveys customer or delivery driver location information as well as identification information about the customer or delivery driver to the local cache management server. The front-end application tracks customer location using global positioning system (GPS) functionality of the mobile device or other location tracking services or information from the mobile device on which it executes. The front-end application transfers the customer location to the management server as a set of coordinates or address.

The front-end application may regularly transfer the location information to the management server. Alternatively, the front-end application may begin periodically transferring the location information to the management server after the management server sends a notification or alert to the front-end application that there are one or more items awaiting pickup by the customer or delivery driver associated with that front-end application instance. In some embodiments, the front-end application sends the location information until the items are picked up from the local cache.

The front-end application may send the location information in response to pings or location queries from the management server. Alternatively, the front-end application may locally monitor the customer or driver position and begins reporting the positions upon detecting the mobile device crossing the local cache perimeter.

The front-end application is an application or other software module running on the mobile device of the customer or delivery driver. To enable the tracking, the customer or delivery driver registers with the management server using the front-end application. The registration identifies the customer or delivery driver and further provides the management server access to location services of the mobile device. The customer mobile device is typically a smartphone or tablet device with network connectivity. The front-end application is not restricted to running solely mobile devices and can be run on any computing device with network connectivity. For instance, the front-end application can be an application embedded within the infotainment system of the customer or delivery driver vehicle. Network connectivity, including broadband wired access or 3G, 4G (long term evolution (LTE)), or 5G wireless access, can be used to facilitate communications between the management server and the different front-end application instances of different customers and delivery drivers.

The local cache threshold distance or perimeter is established to allow the robots within the local cache ample time to retrieve items before the customer can travel from the threshold distance or perimeter to the retrieval window or port where the item will be waiting for customer pickup. The threshold distance or perimeter can change based on demand or time. For instance, most customers may pickup items from a local cache during early mornings and late afternoons when going and coming from work. At such times, the threshold distance or perimeter can be set further from the local cache to provide more time for the robots to perform the item retrieval. At other times when the robots are less busy, the threshold distance or perimeter can be set closer to the local cache.

In some embodiments, the management server accounts for traffic conditions, speed, and distance of customers or delivery drivers from the local cache once they cross the threshold distance or perimeter. By accounting for these factors, the management server can estimate user arrival time and prioritize the retrieval of different customer items. For instance, a first customer may cross the local cache perimeter from the north and a second customer may cross the local cache perimeter from the south. The management server determines that the second customer is likely to arrive before the first customer because of different traffic, speed, and distance of the two customers. Accordingly, the management server instructs a first robot to ready the second customer's items for pickup and queue those items first at the retrieval window or port, before instructing a second robot or the same first robot to ready the first customer's items for pickup. The first customer's items are therefore queued after the second customer's items at the retrieval window or port. Should the first customer arrive first, the robots can reorder the queue and ensure the first customer's items are picked up before the second customer's items.

In some embodiments, the threshold distance or perimeter is changed to avoid false positives of a customer heading to a local cache when they are actually heading elsewhere. As a result, the threshold distance or perimeter need not be concentric or of a regular shape. Irregular shapes can be used to establish perimeters detecting when a customer has turned on the street where the local cache is located or has pulled into the local cache driveway or parking lot as some examples.

To further reduce false positives, the management server may verify customer travel trajectory after the customer crosses the threshold distance or perimeter. In such cases, the management server may change the location information reporting frequency of the front-end application so that the front-end application sends location updates more frequently after having crossed the threshold distance or perimeter. The management server tracks the customer movements to determine if the customer continues moving towards the local cache after having crossed the threshold distance or perimeter.

If verification confirms that the customer is heading to the local cache, the management server then instructs the robots therein to ready the customer's items for pickup. If during the verification, the customer deviates from the local cache, the management server cancels the robot instruction or does not issue the instruction to the robots and the robots return the ordered items back to storage locations within the local cache. In some embodiments, verification involves detecting when the customer turns on a particular street, is within the local cache parking lot, or more generally, is within a second threshold distance from the local cache or crosses a second closer perimeter of the local cache.

Figure 4:
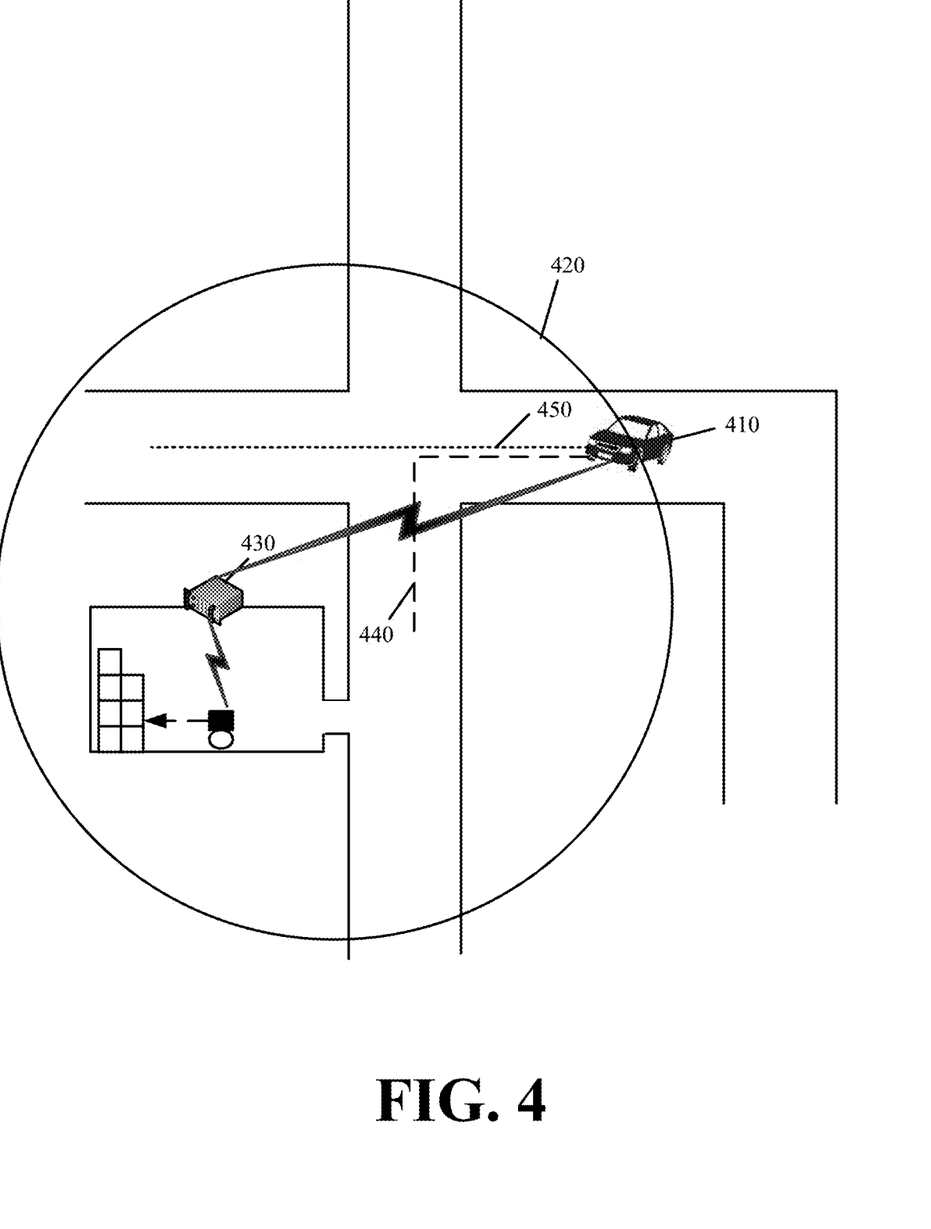
FIG. 4 conceptually illustrates verifying customer trajectory in accordance with some embodiments.

FIG. 4 conceptually illustrates verifying customer trajectory in accordance with some embodiments. As shown, a customer 410 crosses a local cache perimeter 420. Accordingly, the management server 430 instructs a robot to ready an item of the customer 410 for pickup. The management server 430 then continues to monitor the customer 410 in order to determine if the customer 410 continues on a first path 440 towards the local cache or deviates to a second path 450 in which the customer 410 begins to move away from the local cache. If the customer 410 continues along the first path, the retrieval and queuing of the customer 410 item continues. If the customer 410 deviates to the second path, the management server instructs the robot to return the item to local cache storage.

Figure 5:
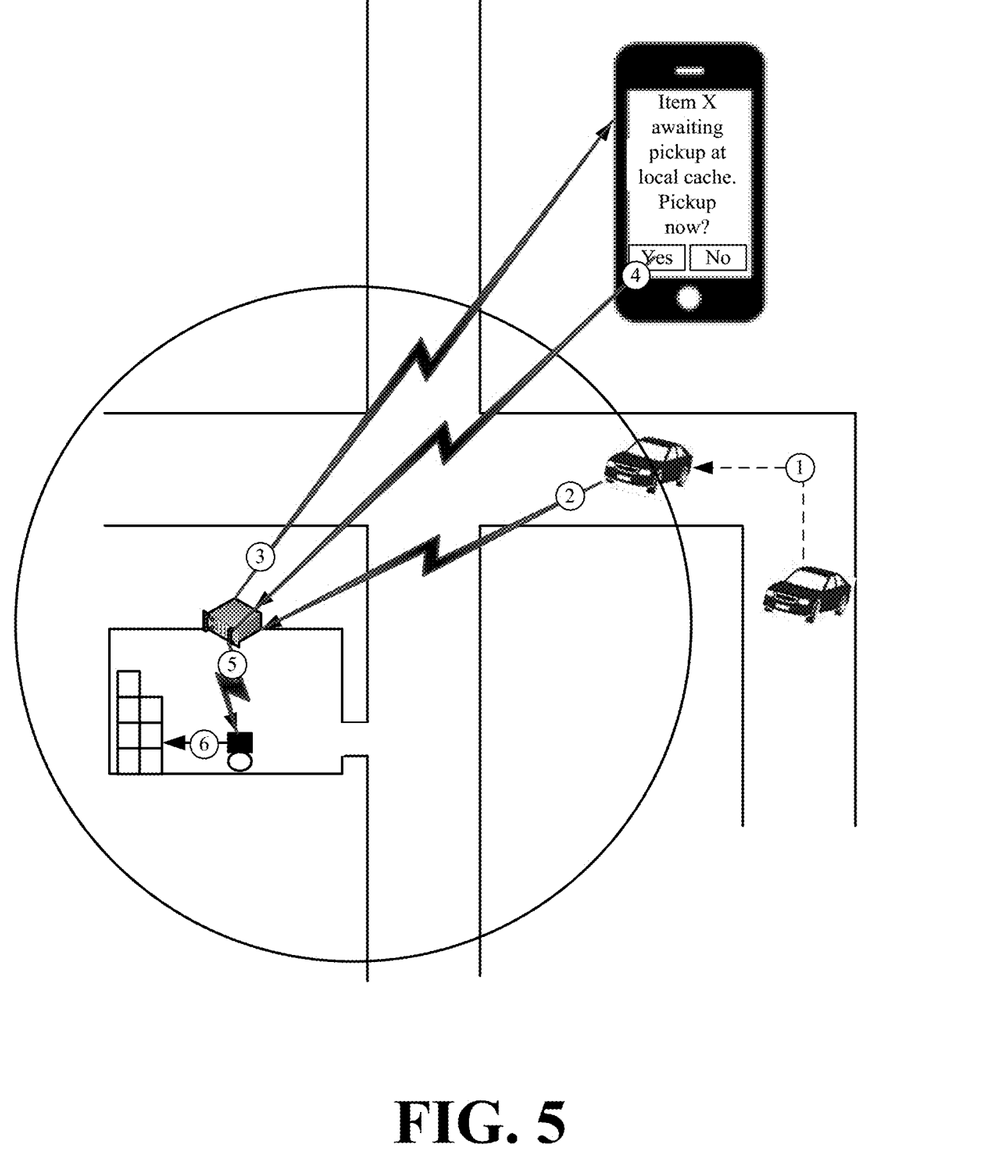
FIG. 5 illustrates confirming pickup by a customer in accordance with some embodiments.

Another method to reduce false positives is to receive direct confirmation from the customer or delivery driver as to their intention of picking up items from the local cache. FIG. 5 illustrates confirming pickup by a customer in accordance with some embodiments. The management server 510, by way of the front-end application 520, provides a confirmation interface to the customer 530 in response to the management server 510 detecting the customer 530 has crossed the threshold distance or perimeter 540. The confirmation interface appears through the front-end application 520 on the customer mobile device and asks the customer 530 whether or not the customer 530 is heading to pickup one or more items from the local cache 540. In response to confirmation from the customer 530, the management server instructs one or more robots in the local cache 540 to ready the customer's 530 items for pickup.

Thus far, the front-end application has been used by the management server to track customer position and notify customers of items awaiting pickup. In some embodiments, the front-end application also verifies that the correct order is being provided to the customer at a retrieval window or port of the local cache. Here again, the location identification services and customer identifying information identify which customer is at the pickup window. The correct items can then be passed to the customer without further additional verification or confirmation. In other cases, the front-end application can present a barcode or other identifier that the customer presents at the retrieval window or port. A robot or human worker scans the barcode or identifier to verify the correct customer is at the retrieval window or port before possession of the customer order items are transferred to the customer.

Customer tracking may not be available for all customers because of limited network connectivity, lack of user device functionality, or because a customer does not wish to be tracked. In such cases, the retrieval protocol can be scheduled by the customer or predetermined based on prior customer behavior.

Customers can leverage the front-end application or a web interface to schedule a time to pickup items from a local cache. The schedule is passed to the management server. The front-end application or web interface can respond and provide the customer with a specific retrieval window or port from which the customer is to pick up the order provided that the local cache has multiple retrieval windows or ports for order pickup. The management server instructs the robots to ready the customer's item some time before the scheduled pickup time. For example, a customer may schedule a 5:30 PM pickup time. At 5:20 PM, one or more robots within the last-mile distribution center set about retrieving customer order items. At 5:28 PM, the robots queue the order items at a retrieval window or port in anticipation of the customer's arrival.

In some embodiments, customers provide their regular travel schedule to the management server through the front-end application or the web interface. The travel schedule can identify the customer's travel routes and times. The robots can then predict when the customer is expected to pass the local cache and instruct the robots to ready the customer's items at those times. In such cases, when the customer arrives at the pickup window, the customer presents some identification before receiving possession of the items. For instance, the customer may present a barcode or other identifier displayed through the front-end application for scanning at the pickup window. The scan identifies the customer and the queued items for that customer. It then only a matter of transferring the item from the pickup window queue to the customer.

The embodiments in which the customer picks up an item from the local cache eliminates last-mile item distribution costs. The savings from eliminating these costs directly pass to merchants. Merchants can then pass these savings to customers through lower shipping costs or lower item pricing.

Nevertheless, some customers prefer the convenience of having their items delivered to their door front. Accordingly, some embodiments provide the last-mile delivery of items using alternative shipping paradigms that reduce last-mile delivery costs relative to traditional shipping paradigms. To this end, some embodiments allow customers, through the front-end application or web interface, to designate others to pickup items on their behalf from the local cache. The designation modifies the local cache operation to ready the items for pickup by the delivery drivers in the automated fashion discussed above. The delivery drivers are therefore able to receive the same drive-thru convenience and minimal delay for item pickup as the customers themselves.

A customer enters a telephone number, email address, or other identifier of the delivery driver using the front-end application or web interface. The information passes to the management server. The management server then authorizes the third party delivery driver to pickup items on behalf of the customer. The authorization involves tracking the third party delivery driver position and instructing the local cache robots to ready the customer's items for pickup in response to the designated delivery driver crossing the local cache established threshold distance or perimeter.

The designation of delivery drivers can be used to allow a spouse, friend, neighbor, or other acquaintance to pickup and deliver items on behalf of a particular customer. In such cases, the delivery driver may perform the delivery free of charge. However, the particular customer may be unable to find someone to perform pickup and delivery for free. Accordingly, some embodiments automatically match available for-hire or paid delivery drivers to customers wanting delivery drivers to deliver items on their behalf. The designation and matching of delivery drivers opens up numerous possibilities for reducing last-mile delivery costs when the customer does not wish to directly pickup his or her order items from the local cache.

In some embodiments, a delivery driver registers with a local cache. The registration identifies the delivery driver as a for-hire contractor that is willing to deliver items of different customers to their respective door fronts for a fee. Thus, similar to how Uber and Lyft have created ridesharing services in which any individual can become a for-hire driver, the embodiments allow for individuals to become last-mile delivery drivers for others.

The registration may restrict the delivery driver to a particular geographic region or neighborhood. The registration can involve performing a background check and verifying the delivery driver's identity. The registration can be performed through the front-end application or web interface with the registration being stored at the management server.

Once registered with the management server of a local cache, the management server can assign or offer delivery tasks to a for-hire delivery driver. The management server can monitor the delivery driver position to ready the assigned items for delivery driver pickup. The management server can also monitor the delivery driver position to ensure that the driver delivers the items by verifying that the driver travels to each customer address along the route. The delivery driver is then paid for the item delivery.

Last-mile delivery costs or payment to the for-hire delivery drivers can be reduced by different optimizations performed by the local cache management server. FIGS. 6-9 illustrates the last-mile delivery optimizations provided by the local cache management server in accordance with some embodiments.

Figure 6:
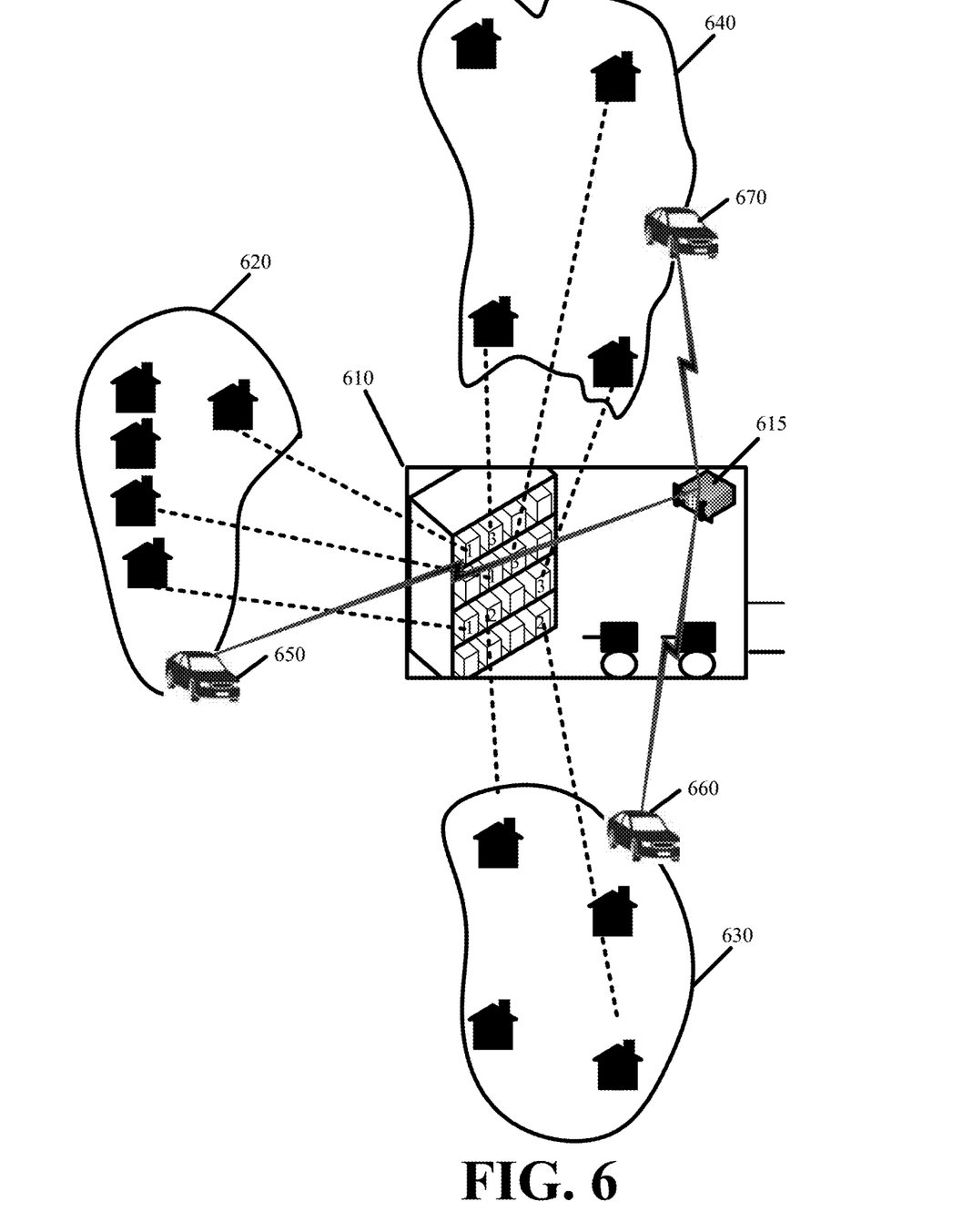
FIGS. 6-9 illustrates the last-mile delivery optimizations provided by the local cache management server in accordance with some embodiments.

FIG. 6 illustrates a local cache 610 with a management server 615, automation robots, and different items pending last-mile distribution to different customers in three distinct regions 620, 630, and 640. The figure also depicts three delivery drivers 650, 660, and 670. Each delivery driver 650, 660, and 670 is registered with the management server 615 for delivering items to at least one of the three distinct regions 620, 630, and 640.

A first optimization performed by the management server 615 involves minimizing the total distance that a delivery driver travels or minimizing the total time it takes a delivery driver to deliver a maximum number of items. To do so, the management server 615 identifies different sets of items with delivery addresses in a common region or within some threshold distance from another delivery address. In this figure, the management server 615 finds which items are delivered to region 620, 630, and 640. The different item sets are illustrated by marking items with numbers one, two, or three corresponding to one of the three distinct regions 620, 630, and 640. The management sever 615 then assigns items for customers located in the same region (e.g., 620, 630, or 640) to the same delivery driver with the delivery driver being paid according to total distance traveled or total time to complete the delivery. The management server 615 therefore assigns the set of items to be delivered to the first region 620 (see items marked with number one in FIG. 6) to the first delivery driver 650, the set of items to be delivered to the second region 630 (see items marked with number two in FIG. 6) to the second delivery driver 660, and the set of items to be delivered to the third region 640 (see items marked with number three in FIG. 6) to the third delivery driver 670.

As before, the assignment causes the management server 615 to monitor the position of the delivery drivers 650, 660, and 680. In response to a particular driver crossing the threshold distance or perimeter established for the local cache, the management server instructs the robots or human handlers within the local cache to ready the items assigned to that particular driver for pickup by the particular driver. Since multiple items are likely to be assigned to a delivery driver as opposed to a customer that comes to pick up a single item, the management server can establish a different threshold distance or perimeter for the delivery drivers than the customers. This will allow the robots or human handlers more time to ready for pickup the set of items that have assigned to the delivery driver.

Figure 7:
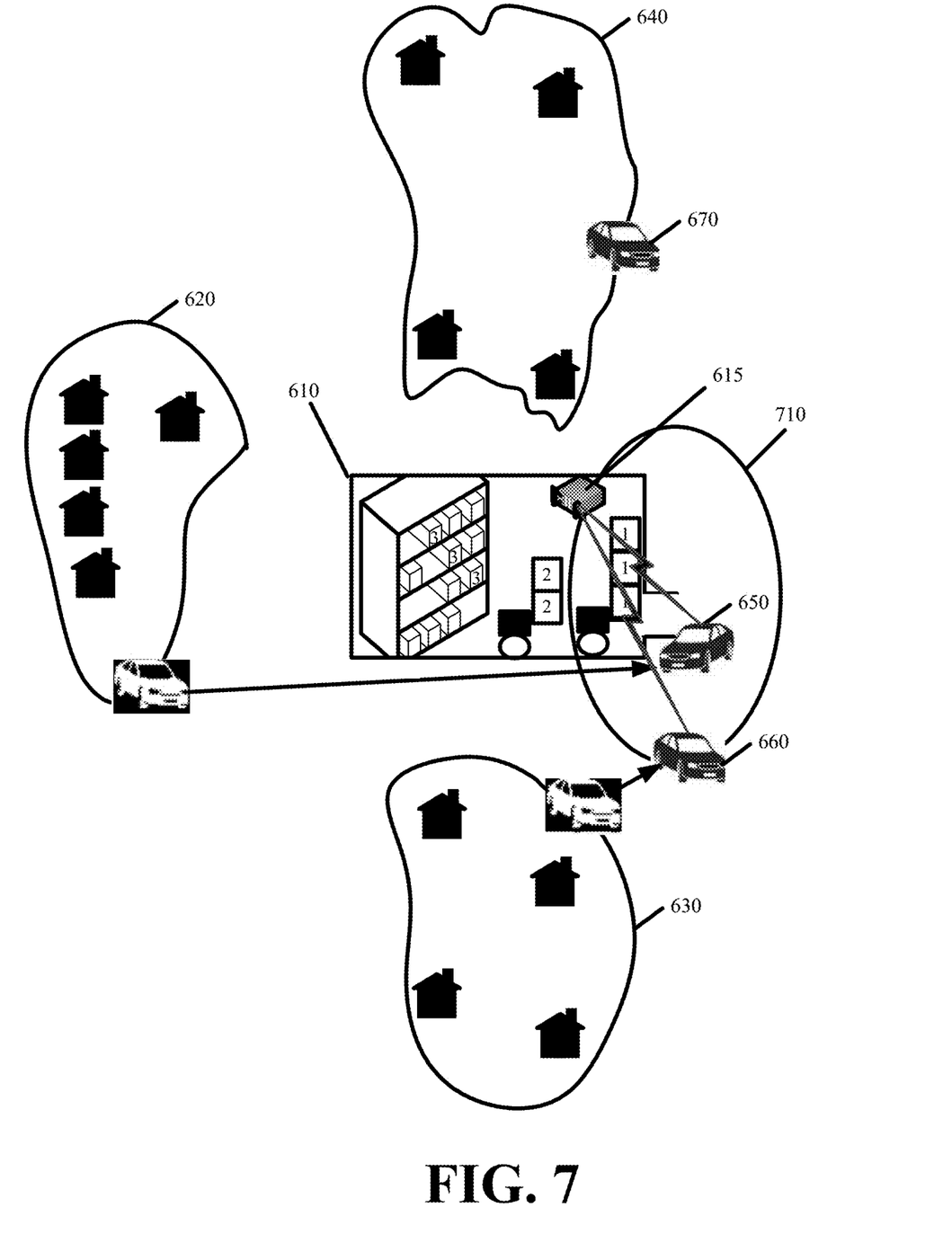
Figure 8:
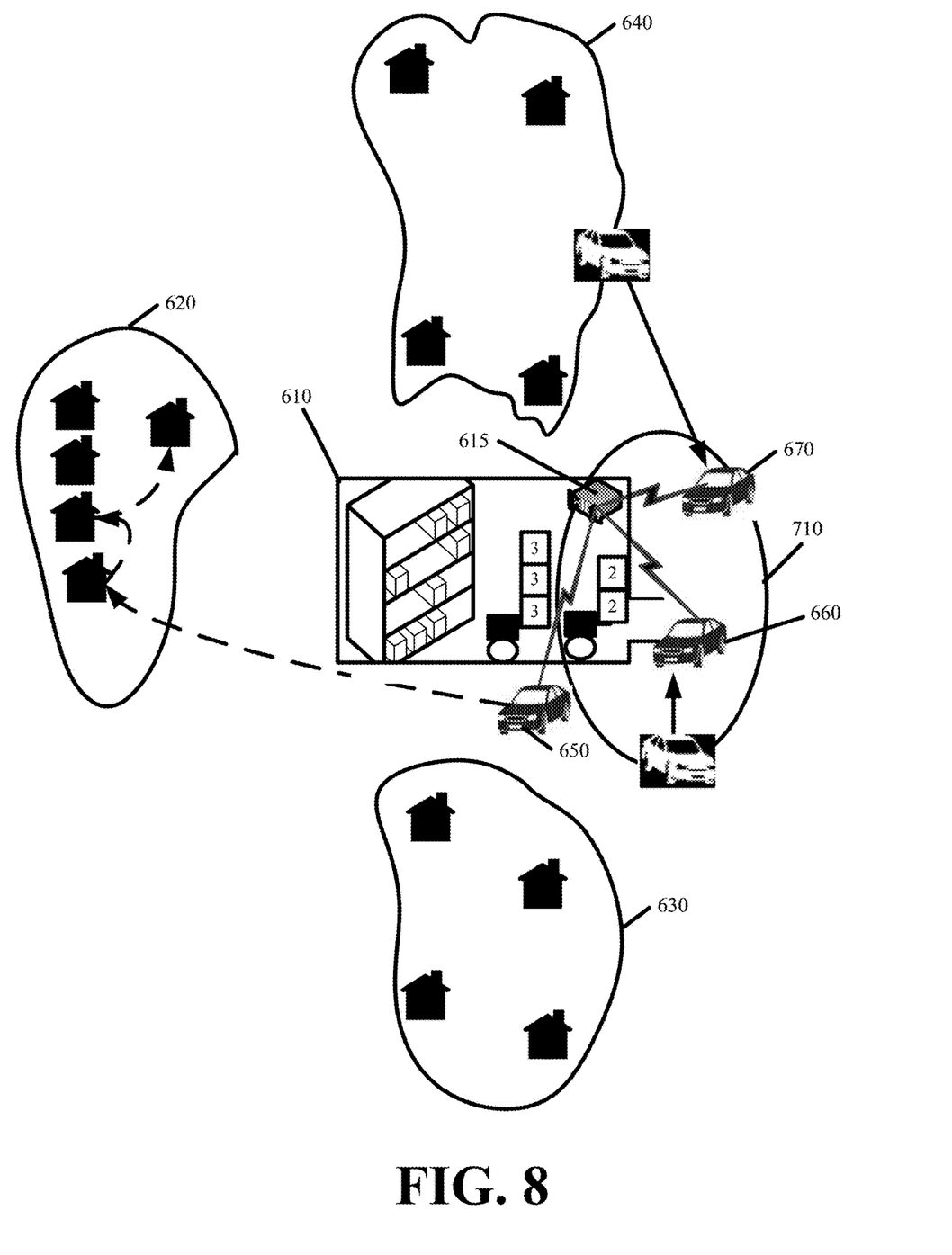
Figure 9:
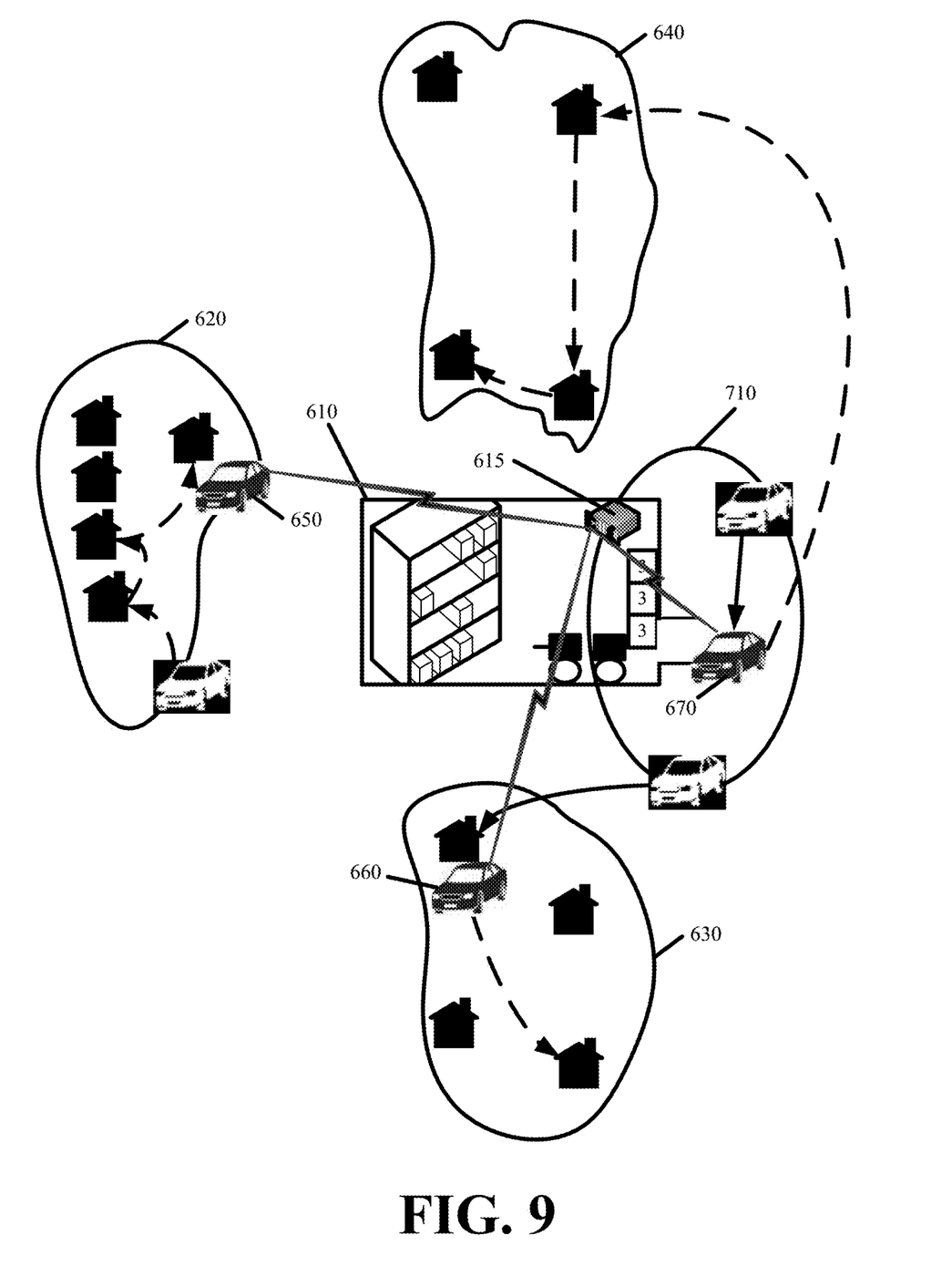

The result of the assignment to the delivery drivers is shown in FIGS. 7-9. FIG. 7 illustrates the local cache 610 robots transferring the first set of items for delivery to the first region 620 to the first delivery driver 650 in response to the management server 615 detecting arrival of the first delivery driver 650 at the local cache 610 retrieval window. FIG. 7 also illustrates the management server 615 detecting the second delivery driver 660 crossing the perimeter 710 established for the local cache 610. The management 615 then instructs the robots to ready and queue the second set of items at the local cache 610 retrieval window.

FIG. 8 illustrates a second optimization that the management server 610 performs with respect to the last-mile delivery provided by different delivery drivers. The second optimization involves the management server 610 generating and issuing an optimal delivery route for the items that are assigned to a delivery driver for last-mile item delivery. In some embodiments, the optimal route specifies an order with which items are to be delivered along with turn-by-turn instructions for conducting the delivery in the shortest amount of time or total distance. As shown in FIG. 8, the first delivery driver 620 follows a particular route generated by the management server 610 in delivering the first set of items to different door fronts within the first region 620. The management server can account for traffic conditions, construction, and other obstacles that affect the last-mile delivery of items when determining the optimal route. The management server can track the driver to ensure compliance with the optimal route and delivery of the items. In some embodiments, the driver must follow the optimal route for payment.

FIG. 8 also illustrates the local cache 610 robots transferring the second set of items to the second delivery driver 660 upon arrival of the second delivery driver 660 at the local cache 610 retrieval window. The figure also illustrates the local cache 610 robots readying and queuing the third set of items upon the management server 610 detecting the third delivery driver 670 crossing the local cache perimeter 710.

FIG. 9 illustrates the first delivery driver 650 delivering the first set of items in the first region 620 according to the optimal route generated by the management server 615. The figure also illustrates optimal routes the management server 615 provides to the second and third delivery drivers 660 and 670 for optimal item delivery within each of the regions 630 and 640 assigned to those delivery drivers.

In some embodiments, the management server distributes or divides the fee paid to a particular delivery driver across customers in the route assigned to the particular delivery driver or across merchants whose items were delivered by the particular delivery driver. For example, in a congested city, a delivery driver may deliver ten items to ten different customers along a route that spans a total of five miles. If driver is paid $3 per mile, then the total payout to the driver is $15 with each customer paying $1.50 for their delivery. The cost can be further divided according to the number of items or size of items delivered to each customer along a route.

The last-mile delivery optimization can be performed periodically (e.g., daily) by the local cache management server. For instance, when shipments arrive at the local cache each morning, the management server can update the local cache inventory and determine the delivery address for each of the customers that requested the last-mile delivery of the items. The management server computes the optimal ordering and delivery routes for the items received that day. The management server then notifies different delivery drivers of the routes and the payments for each route. The delivery drivers can accept the routes and perform the delivery with the last-mile delivery costs distributed across a set of customers associated with an optimal route or the merchants.

In some embodiments, the local cache management server submits the delivery routes with a payment that will be offered to registered for-hire delivery drivers through the front-end applications installed on delivery driver devices. The management server then assigns delivery of items along a particular route to the first delivery driver to accept the corresponding offer or to the closest delivery driver that accepts the offer within a specific period when time is also a factor.

In some embodiments, the local cache management server submits the delivery routes with a maximum payment that will be offered to registered for-hire delivery drivers through the front-end applications installed on delivery driver devices. The delivery drivers can then submit bids for lower fees they are willing to accept to perform delivery back to the management server using the front-end application. The management server can then assign the route and items to the driver willing to perform the delivery for the lowest fee.

Some embodiments reduce the last-mile delivery cost and incentivize delivery drivers to deliver items from the local cache to customer door fronts by providing a marketplace for such services. Customers that do not want to pick up their items from the last-mile distribution center can enter an amount they are willing to pay for a delivery driver to perform the pickup and deliver on their behalf. The amounts are entered through the front-end application or a web interface. The offers along with the distance or route from the local cache to the customer door front associated with each offer are presented to the delivery drivers using the front-end application. Delivery drivers then have the option to accept or decline the offer.

For instance, a first customer offers $1 for a delivery driver to pickup and deliver a first customer item from the local cache. The delivery driver sees the offer but declines. The first customer offer remains pending for some period of time. Sometime later a second customer offers $5 for a delivery driver to pickup and deliver a second customer item from the local cache. The second customer delivery address may be located close to the first customer delivery address. Accordingly, the delivery driver accepts to pickup and deliver the first customer order and the second customer order since the delivery driver would be driving to that area to drop off the second customer order. The delivery driver accepts both offers using the front-end application.

Upon accepting the offers, the delivery driver's location is used to initiate the retrieval protocol at the local cache for the first customer order and the second customer order. Therefore, when the delivery driver crosses the threshold distance or perimeter established for the local cache, the robots or human handlers within the local cache set about retrieving the first customer order and second customer order per instruction from the management server. The robots or human handlers transfer the order items to the delivery driver upon the delivery driver arrival at the local cache retrieval window. The management server then monitors the delivery driver path to verify that the delivery driver travels to the first customer delivery address and the second customer delivery address before paying the delivery driver the $6 sum.

Another scenario involves using trusted neighbors. In some such scenarios, a customer drives to the local cache in order to pickup his own items as well as items for his neighbors. Since the customer drives towards or past his neighbors to get to his own home, the customer can volunteer or be paid a small amount to also deliver orders to the door front of his neighbors. Alternatively, the driver can place the items outside his own home and the neighbors can make the very short trip to pick up their items. In some such embodiments, the management server through the front-end application queries the customer driver if he is willing to deliver the neighbor items and further queries the neighbor customers if they authorize the customer driver to perform the last-mile delivery of their items.

In some embodiments, the local cache also functions as a physical storefront or merchant location. In some such embodiments, the local cache directly sells different items to customers. Customers can remotely place orders directly from the local cache using the front-end application or a web interface. The front-end application or web interface therefore serves as a virtual storefront from which items can be purchased and readied at a physical storefront for pickup by the customer.

As one example, the local cache can be a functional grocery store. The front-end application displays items that a customer can purchase from the grocery store. The customer creates an order with different items using the front-end application. The customer order passes to the management server. The management server then conveys the customer order to one or more robots or human handlers operating within the local cache grocery store. The robots or human handlers set about retrieving each item of the customer order. The customer order items can be placed in temporary storage area within the local cache.

The management server tracks the customer's location using the front-end application. As the customer nears the grocery store, the robots or human handlers move the customer order items to a retrieval window where the customer can simply drive by and pickup the items without having to enter the grocery store. Alternatively, the items can be moved to a retrieval counter within the store and the customer simply retrieves the items and leaves. The customer is billed for the items directly through the front-end application. In preferred embodiments, the customer provides credit card information to the application that can be used to bill for the transaction.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
storing a plurality of items belonging to a plurality of users at a storage facility;
operating a plurality of autonomous robots in the storage facility, each particular autonomous robot of the plurality of autonomous robots comprising a wheeled-base and a retriever with which the particular autonomous robot transfers and carries different items of the plurality of items between storage locations and one or more retrieval ports of the storage facility;
detecting a first user from the plurality of users crossing a first perimeter around the storage facility;
identifying a storage location within the storage facility for a first item, from the plurality of items, belonging to the first user;
prioritizing retrieval of the first item over a second item of a second user headed to the storage facility in response to estimating arrival time of the first user to be less than an arrival time of the second user;
automatically triggering a first autonomous robot from the plurality of autonomous robots in autonomously transferring the first item from the storage location to a particular retrieval port via motorized movements of the wheeled-base and the retriever and in response to said detecting; and
queuing the first autonomous robot with the first item before a second autonomous robot of the plurality of autonomous robots with the second item at the particular retrieval port in response to said prioritizing.

2. The method of claim 1, wherein said queuing comprises stopping the first autonomous robot with the first item at the particular retrieval port prior to the first user arriving at the particular retrieval port.

3. The method of claim 1 further comprising monitoring movements of the first user while the first user is within the first perimeter.

4. The method of claim 3 further comprising automatically triggering the first autonomous robot in transferring the first item from the particular retrieval port to the first user via additional motorized movements of the first autonomous robot in response to identifying the first user arriving at the particular retrieval port as a result of said monitoring.

5. The method of claim 3 further comprising automatically triggering the first autonomous robot in returning the first item to the storage location within the storage facility via additional motorized movements of the first autonomous robot in response to identifying the first user exiting the first perimeter as a result of said monitoring.

6. The method of claim 1 further comprising providing an application for execution on a network enabled mobile device of the first user.

7. The method of claim 6 further comprising receiving location information about the first user from the application.

8. The method of claim 6 further comprising alerting the first user through the application about the first item pending pickup from the storage facility.

9. The method of claim 1 further comprising assigning the first item to a different delivery driver performing last-mile item delivery on behalf of the first user, and operating the first autonomous robot in retrieving the first item for pickup by the delivery driver in response to detecting the delivery driver crossing the first perimeter.

10. The method of claim 1 further comprising detecting the second user crossing the first perimeter contemporaneous with the first user crossing the first perimeter, and operating the second autonomous robot in retrieving the second item belonging to the second user.

11. The method of claim 10 further comprising changing said queuing of the first and second autonomous robots by automatically triggering the second autonomous robot in transferring the second item from the particular retrieval port to the second user before the first autonomous robot transfer the first item to the first user in response to detecting arrival of the second user at the storage facility before the first user.

12. The method of claim 1 further comprising:
identifying a set of items from the plurality of items belonging to a set of customers that are geographically proximate to the first user;
automatically triggering the first autonomous robot in retrieving and queuing the set of items in conjunction with the first item of the first user at the particular retrieval port in response to said detecting and prior to the first user arriving at the storage facility; and
transferring possession of the first item and the set of items from the first autonomous robot to the first user at the particular retrieval port in response to the first user arriving at the particular retrieval port.

13. The method of claim 12 further comprising generating an optimal route with which to deliver the set of items to the set of customers, wherein generating the optimal route comprises minimizing at least one of total distance and total time required to deliver the set of items to the set of customers.

14. The method of claim 13, wherein generating the optimal route comprises ordering delivery of the set of items and issuing turn-by-turn instructions for delivering the set of items according to said ordering.

15. The method of claim 13 further comprising computing a delivery fee for delivering the set of items according to the optimal route, and notifying a plurality of delivery drivers comprising the first user of a job involving delivery of the set of items for the delivery fee.

16. The method of claim 15 further comprising receiving acceptance of the job for the delivery fee or a lesser fee from the first user.

17. The method of claim 15 further comprising receiving a fee from each customer of the set of customers, wherein each particular customer fee specifies an amount the particular customer is willing to pay to have items belonging to the particular customer delivered from the storage facility, and wherein computing the delivery fee comprises totaling the fee received from each customer of the set of customers.

18. The method of claim 1 further comprising verifying that the first user is headed to the storage facility based on trajectory of the first user.

19. The method of claim 1 further comprising:
setting, based on a first amount of demand at a first time, the first perimeter around the storage facility which when crossed by a user triggers automatic retrieval of items belonging to that user by at least one autonomous robot of the plurality of autonomous robots;
setting a second perimeter, with different dimensions than the first perimeter, around the storage facility based on a different second amount of demand at a later second time.

20. A system comprising:
a storage facility storing a plurality of items belonging to a plurality of users;
a plurality of autonomous robots operating in the storage facility, each particular autonomous robot of the plurality of autonomous robots comprising a wheeled-base and a retriever with which the particular autonomous robot transfers and carries different items of the plurality of items between storage locations and one or more retrieval ports of the storage facility; and
a robot management device comprising:
one or more processors configured to:
detect a first user from the plurality of users crossing a first perimeter around the storage facility;
identify a storage location within the storage facility for a first item, from the plurality of items, belonging to the first user;
prioritize retrieval of the first item over a second item of a second user headed to the storage facility in response to estimating arrival time of the first user to be less than an arrival time of the second user;
automatically trigger a first autonomous robot from the plurality of autonomous robots in autonomously transferring the first item from the storage location to a particular retrieval port via motorized movements of the wheeled-base and the retriever and in response to said detecting; and
queue the first autonomous robot with the first item before a second autonomous robot of the plurality of autonomous robots with the second item at the particular retrieval port in response to said prioritizing.

21. A non-transitory computer-readable medium, storing a set of processor-executable instructions, which, when executed by one or more processors, cause the one or more processors to:
set, based on a first amount of demand at a first time, a first perimeter around the storage facility which when crossed by a user triggers automatic retrieval of items belonging to that user by one or more autonomous robots;
detect a particular user from a plurality of users crossing the first perimeter;
identify a storage location within the storage facility for a first item, from a plurality of items, belonging to the particular user;
estimate arrival time of the particular user based on speed and the trajectory of the particular user;
prioritize retrieval of the first item over a second item of another user headed to the storage facility in response to the arrival time of the particular user being less than an arrival time of the other user;
verify that the particular user is headed to the storage facility based on the trajectory of the particular user;
select a particular retrieval port from a plurality of retrieval ports of the storage facility at which to transfer the first item to the particular user;
automatically trigger a particular robot from the one or more autonomous robots in autonomously retrieving the first item from the storage location to the particular retrieval port via motorized movements of the particular robot and in response to one or more of said detecting, estimating, prioritizing, and selecting;

operate the particular robot in transferring the first item to the particular user in response to said verifying and identifying the particular user arriving at the particular retrieval port;

set a second perimeter, with different dimensions than the first perimeter, around the storage facility based on a different second amount of demand at a later second time.

* * * * *